United States Patent [19]

Manequini

[11] Patent Number: 5,630,931
[45] Date of Patent: May 20, 1997

[54] PROCESS FOR THE HYDROMETALLURGICAL AND ELECTROCHEMICAL TREATMENT OF THE ACTIVE MASS OF EXHAUSTED LEAD BATTERIES, TO OBTAIN ELECTROLYTIC LEAD AND ELEMENTAL SULPHUR

[75] Inventor: Adilson C. Manequini, Toronto, Canada

[73] Assignee: Ecowin S.R.L., Milan, Italy

[21] Appl. No.: 591,717

[22] Filed: Jan. 25, 1996

[30]  Foreign Application Priority Data

Jan. 25, 1995 [CA]  Canada ................................ 2141099

[51] Int. Cl.$^6$ .................................................. C25D 5/06
[52] U.S. Cl. ..................... 205/600; 423/98; 423/578.1
[58] Field of Search ............................ 205/599, 600, 205/601; 423/98, 578.1; 75/711, 743

[56]  References Cited

U.S. PATENT DOCUMENTS

| | | | |
|---|---|---|---|
| 2,017,612 | 10/1935 | Tainton | 205/599 |
| 4,107,007 | 8/1978 | Gaumann et al. | 204/116 |
| 4,118,219 | 10/1978 | Elmore et al. | 75/103 |
| 4,229,271 | 10/1980 | Prengaman et al. | 204/114 |
| 4,385,038 | 5/1983 | Rastas | 423/26 |
| 4,460,442 | 7/1984 | Ducati | 204/114 |
| 4,927,510 | 5/1990 | Olper | 204/114 |
| 5,039,337 | 8/1991 | Olper | 75/725 |
| 5,211,818 | 5/1993 | Moure | 205/599 |
| 5,262,020 | 11/1993 | Masante et al. | 204/114 |
| 5,441,609 | 8/1995 | Olper | 205/599 |
| 5,514,263 | 5/1996 | Spijkerman | 205/348 |

FOREIGN PATENT DOCUMENTS 411687  2/1991  European Pat. Off. .

OTHER PUBLICATIONS (XP 2002255) JOM, "Recovering Lead from Batteries"; R. David Prengaman; Jan. 1995; pp. 31–33; Warrendale, U.S.

*Primary Examiner*—John Niebling
*Assistant Examiner*—Brendan Mee
*Attorney, Agent, or Firm*—Foley & Lardner

[57]  ABSTRACT

A hydrometallurgical and electrochemical process for treating exhausted lead batteries, in particular the active mass and the electrolyte, is described having as products electrolytically obtained lead and elemental sulphur. The active mass (paste) obtained from the mechanical processing of the exhausted batteries, consisting mainly of lead sulphate and dioxide, is dispersed in a dilute $H_2SO_4$ solution and then reacted with an $Na_2S$ solution to convert all the lead compounds present into insoluble lead sulphide and sodium sulphate. After filtration, the sodium sulphate solution is evaporated to obtain the anhydrous salt. From this, by thermal reduction with carbon, the $Na_2S$ is reformed for use in treating further paste. The lead sulphide obtained in this manner is leached with an electrolyte based on ferric fluoborate, which oxidizes the sulphide to elemental sulphur and solubilizes the lead in the form of fluoborate. After filtering the residue containing the elemental sulphur, the lead fluoborate solution is electrolyzed in a diaphragm cell to obtain electrolytic lead in the cathodic compartment and regenerate the ferric fluoborate in the anodic compartment for use in leaching further sulphide.

15 Claims, 1 Drawing Sheet

PROCESS FOR THE HYDROMETALLURGICAL AND ELECTROCHEMICAL TREATMENT OF THE ACTIVE MASS OF EXHAUSTED LEAD BATTERIES, TO OBTAIN ELECTROLYTIC LEAD AND ELEMENTAL SULPHUR

BACKGROUND OF THE INVENTION

Hydrometallurgical processes for treating exhausted lead batteries form part of the technical know-how of this industrial sector. Experts of this sector and lead manufacturers both totally agree on the advantages of previously desulphurizing the paste to be reduced pyrometallurgically to lead.

This procedure avoids stack $SO_2$ emission, which in contrast occurs with direct thermal reduction of non-desulphurized paste. The following desulphurization reactions are currently used:

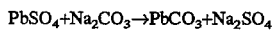
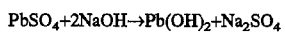
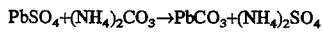

$$PbSO_4 + Na_2CO_3 \rightarrow PbCO_3 + Na_2SO_4$$

$$PbSO_4 + 2NaOH \rightarrow Pb(OH)_2 + Na_2SO_4$$

$$PbSO_4 + (NH_4)_2CO_3 \rightarrow PbCO_3 + (NH_4)_2SO_4$$

The results of the desulphurization are satisfactory to a greater or lesser extent depending on whether sodium carbonate, ammonium carbonate or caustic soda are used for the conversion. After treatment, the desulphurized paste is suitable for pyrometallurgical reduction, although auxiliary additives have to be added to control sulphur emissions and minimize the lead content of the slag, which has to be dumped on a toxic material dump.

The problems of how to dispose of the $Na_2SO_4$ or $(NH_4)_2SO_4$ produced in the reaction remain.

$Na_2SO_4$ can be produced at a purity level suitable for its use in the detergents industry, although this market is in decline.

Alternatively, $Na_2SO_4$ can be treated in an electrolytic diaphragm plant particularly designed to reproduce in the cathodic compartment an NaOH solution suitable for desulphurization and in the anodic compartment an $H_2SO_4$ solution reusable in batteries. $(NH_4)_2SO_4$ can be reused as fertilizer, although there is a surplus of this product.

Alternatively, $(NH_4)_2SO_4$ can be made basic with calcium and the resultant ammonia recycled to desulphurization with the addition of $CO_2$, however a large quantity of chalk formed in the reaction has to be dumped.

For ecological reasons, some of the said methods have found wide application in the industrial pyrometallurgy of lead, although they have been found costly in practice, and many questions exist regarding continuity of demand for the by-products obtained and the availability of dumps for the slag obtained from pyrometallurgical processes.

The situation is even more complicated for the integrated lead recovery cycle based on hydrometallurgy and electrochemistry. The basic problem of this integrated cycle is that of solubilizing all the lead components of the paste to form a solution suitable for electrolysis in an electrochemical cell to obtain lead.

Numerous processes based on intense experimental work have been proposed to solve this problem.

The following list summarizes the main existing processes:

Gaumann in U.S. Pat. No. 4,107,007 of 1978 leaches the paste with an alkaline hydroxide solution containing added molasses or sugar: the oxide and sulphate pass into solution and go to alkaline electrolysis.

The quality of the lead obtained does not however satisfy market quality requirements.

Elmore in U.S. Pat. No. 4,118,219 of 1978, who converts the sulphate with ammonium carbonate, indicates a series of reducing agents such as formaldehyde, $H_2O_2$ and metallic Pb to reduce the $PbO_2$ of the paste: the object of this process is to obtain lead compounds reusable in the battery sector. The process has never been applied.

Prengaman in U.S. Pat. No. 4,229,271 of 1980 treats the aqueous paste suspension with $SO_2$ (or alternatively with $Na_2SO_3$, $NaHSO_3$ or $NH_4HSO_3$) during desulphurization to reduce the $PbO_2$; he then leaches the product obtained with fluoboric acid and feeds the Pb fluoborate to electrolysis with insoluble anodes for oxygen development.

Ducati in U.S. Pat. No. 4,460,442 of 1984 treats the paste at 100°–120° C. with a concentrated alkali solution to obtain a red lead precipitate which is completely soluble in a hot concentrated $HBF_4$ or $H_2SiF_6$ solution in the presence of metallic Pb. This solution is then fed to electrolysis with insoluble anodes for oxygen development.

Olper in U.S. Pat. No. 4,927,510 of 1990 desulphurizes the paste with NaOH and then leaches with $HBF_4$: the insoluble $PbO_2$ remains in the residue, which is treated with concentrated $H_2SO_4$. During the process not only is $PbO_2$ converted into $PbSO_4$ (to undergo desulphurization) but all residual organic substances in the paste are eliminated.

Again in this case the final object of the process is to solubilize the $PbO_2$ to form an electrolyte for electrochemical recovery using insoluble anodes for oxygen development. M.A. Industries in U.S. patent application Ser. No. 850,278 of 1991 desulphurizes the paste with $(NH_4)_2CO_3$ and then leaches with the fluoboric electrolyte with an added titanium (or alternatively vanadium, cerium or iron) salt which because of its variable valency is able to form with the lead the redox pair necessary for reducing the $PbO_2$. However the presence of a redox pair in solution interferes negatively with the lead electroextraction.

The ammonium carbonate produced is causticized for regeneration: during the process a large quantity of chalk forms for disposal.

None of the indicated processes is therefore free from drawbacks, namely:

The excessive cost of the reagents used for desulphurization and for reducing the $PbO_2$.

The progressive accumulation of alkaline metals in the fluoboric (or fluosilicic) electrolyte and the consequent difficulty of purifying it.

The generation of by-products which are often unusable and polluting, and hence have to be dumped.

The low Pb extraction yield, which in industrial practice is between 90% and 95%.

The high energy consumption of the anodic oxygen development reaction.

The need to use anodes which are insoluble, or of very high cost, or of uncertain life.

SUMMARY OF THE INVENTION

The object of the present invention is to solve the still unsolved problems of the hydrometallurgical and electrochemical processing of the active mass of lead batteries, and in particular:

- to reduce the use and cost of the reagents employed;
- to reduce the process operations, so preventing dust and vapour emission harmful to personnel, and eliminating the production of toxic refuse to be dumped and the production of salts of uncertain commercial demand;
- to reduce the energy cost of electrolytic Pb production and the consumption of insoluble electrolysis electrodes; and to increase the Pb extraction yield from the paste.

All these objects are surprisingly achieved by the present invention using a process for the hydrometallurgical and electrochemical production of electrolytic lead from an active mass containing lead sulphate $PbSO_4$, lead dioxide $PbO_2$, and lead oxide PbO of exhausted lead batteries, comprising treating said active mass, containing lead sulphate $PbSO_4$, lead dioxide $PbO_2$ and lead oxide PbO, with sodium sulphide $Na_2S$ and sulfuric acid, giving rise to the following reactions:

(1a)

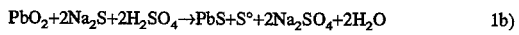
(1b)

(1c)

DETAILED DESCRIPTION OF PREFERRED EMBODIMENTS

Figure 1:
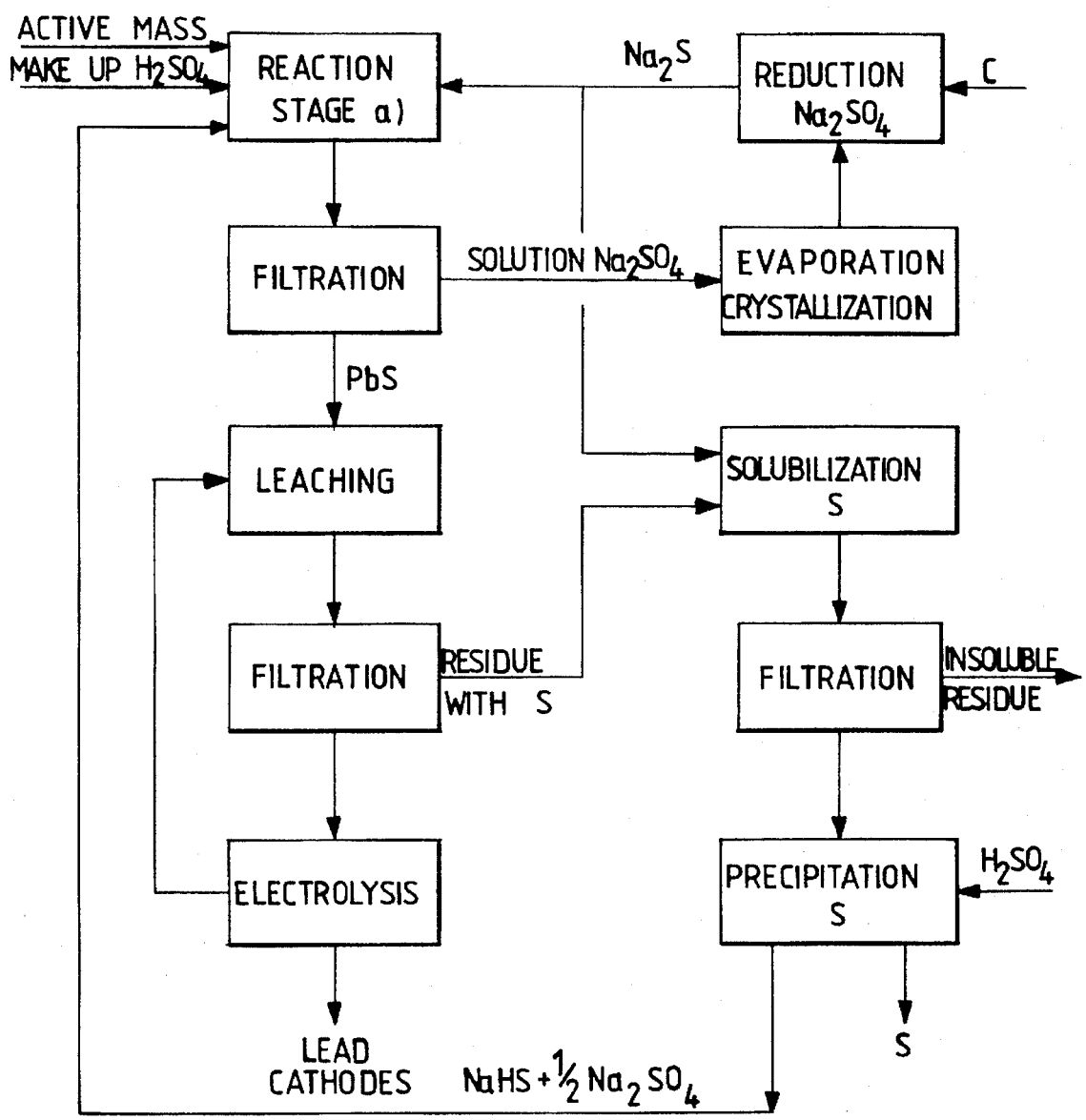
FIG. 1 is a flow diagram of a process according to the invention.

According to the process of the invention, the active mass or lead paste obtained from the mechanical processing of exhausted batteries and suspended in an $H_2SO_4$ solution, for example originating from the battery itself, is reacted with an $Na_2S$ solution to convert all the lead compounds contained in the active mass into insoluble lead sulphide, and obtain $Na_2SO_4$ in solution.

The lead sulphide obtained by filtration from the preceding stage is reacted with an electrolyte based on ferric fluoborate (leaching) to obtain lead fluoborate in solution and elemental sulphur contained in the leaching residue, which is separated by filtration.

Said lead fluoborate solution is electrolyzed in a diaphragm cell, to obtain electrolytic Pb in the cathodic compartment and ferric fluoborate in the anodic compartment, which is returned to leach further lead sulphide.

The sodium sulphate formed in the first stage is then converted into sodium sulphide by thermal reduction with powdered carbon.

The sodium sulphide obtained is returned to said first stage to treat further active mass (or paste).

Finally the elemental sulphur is recovered from the leaching residue of the second stage and refined, the sulphur being extracted with an $Na_2S$ solution, which is then acidified with $H_2SO_4$ to obtain the elemental sulphur in a very pure form.

For a better understanding of the characteristics and advantages of the invention, a description is given hereinafter of one embodiment of the process according to the invention as heretofore substantially defined, with reference to the flow diagram shown as a block scheme on the accompanying drawing.

In accordance with the block diagram (FIG. 1) of the accompanying drawing, the starting material is the active mass separated from the other exhausted battery components by known methods. The lead compounds contained in it are dispersed in a dilute $H_2SO_4$ solution originating from the same battery and are reacted with a sodium sulphide solution in accordance with the three following reactions:

(1a)

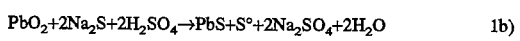
(1b)

(1c)

As the solubility product of PbS is much lower than that of $PbCO_3$ and $Pb(OH)_2$, conversion into PbS is close to 100% with a reaction yield better than that for conversion into $PbCO_3$ and into $Pb(OH)_2$.

As can be seen from reaction 1b), $Na_2S$ in acid solution reduces $PbO_2$ with formation of insoluble elemental S.

The other reducing agents and reagents used in the aforesaid known art hence become superfluous. The three reactions of the first stage of the invention occur rapidly and simultaneously within the same reactor using the same reagent $Na_2S$. Relevant factors in the conversion of the paste to PbS are pH control and temperature; at about 60° C. and at a pH not exceeding 2–3, the reaction is complete in about 2 h. It should be noted that it is not necessary to supply heat as the reaction 1b) is exothermic.

If the acid contained in the battery is not sufficient for the described reactions, recovered sulphuric acid is used as make-up. The subsequent filtration for separating the PbS from the $Na_2SO_4$ solution is particularly simple and rapid because of the microcrystalline nature of the PbS obtained and the particular process conditions.

This fact is of fundamental importance because the $Na_2SO_4$ which has soaked into the filter panel can be completely removed by sufficient washing: the PbS is not contaminated with sodium salt, hence preventing accumulation of the $Na^+$ ion in the electrolyte of the subsequent electrolysis process.

It is hence no longer necessary to purify the electrolyte to eliminate this contaminant.

The lead contained in the PbS is dissolved by leaching with a ferric fluoborate solution in accordance with the reaction:

$$PbS + 2Fe(BF_4)_3 \rightarrow Pb(BF_4)_2 + 2Fe(BF_4)_2 + S°$$

Surprisingly this reaction occurs at a very high rate even at ambient temperature, with maximum yield of dissolved Pb. The elemental sulphur is crystalline and easy to filter off. The reactivity of the PbS precipitated chemically under the appropriate conditions indicated in stage a) is very high compared with that of lead sulphide of mineral origin in the same leaching medium.

Electrolysis of Pb fluoborate in a diaphragm cell pertains to the known art and can be represented by two reactions:

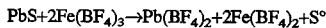

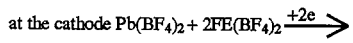

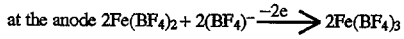

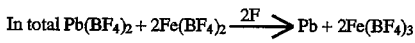

This electrolytic process occurs at a voltage of about 1000 mV less than that of Pb electrowinning with the production of $O_2$ because of the different anodic reaction, which corresponds to a saving of about 300 kW/tPb. As $O_2$ is not evolved at the anode, graphite anodes can be used, which are of lower cost and significantly greater life (>5 years) than the other anodes used in electrolysis with $O_2$ development. The anodic process does not emit gas: hence the acid mist characteristic of such processes is prevented.

The $Na_2SO_4$ solution resulting from the paste conversion and subsequent filtration is evaporated and crystallized by known methods, possibly using the hot exit gas from the sulphate reduction furnace.

The sodium sulphate obtained is transformed into sodium sulphide with powdered carbon in accordance with the known art, by the reactions:

$$Na_2SO_4 + 2C \rightarrow Na_2S + 2CO_2$$

$$Na_2SO_4 + 4C \rightarrow Na_2S + 4CO$$

With a carbon quantity 25% of the sodium sulphate the conversion yield is >90%.

After 1.5 hours of reaction at 900° C. a fluid product is obtained without $SO_2$ emission, and is discharged from the furnace. By cooling on a metal belt water-soluble flakes are obtained, the unreacted sodium sulphate also passing into solution and circulating with the $Na_2S$ solution which is used to convert further paste.

The elemental sulphur and the inerts contained in the paste (minute fragments of plastic and separators, glass fibres, additives introduced during plate forming etc.) constitute the filtration residue after leaching the lead sulphide. The sulphur can be conveniently recovered in pure form by treating the residue with an $Na_2S$ solution.

The following reaction occurs:

$$Na_2S + nS \rightarrow Na_2S_{n+1}$$

It should be noted that after this extraction the final residue is inert towards the elution test in accordance with EPA standards and can be discharged as a non-toxic residue.

The $Na_2S_{n+1}$ polysulphide solution is converted into sulphur by acidifying it with $H_2SO_4$.

$$Na_2S_{n+1} + \tfrac{1}{2}H_2SO_4 \rightarrow \tfrac{1}{2}Na_2SO_4 + NaHS + nS°$$

The precipitated sulphur is filtered off and dried and constitutes a pure marketable product.

The $Na_2SO_4$ and NaHS solution is fed together with the product of stage d) for converting the paste in stage a).

EXAMPLE

For the tests described in this example the paste used was that normally produced from exhausted batteries and had the following weight composition on a dry basis:

| COMPONENT | % | Pb% |
|---|---|---|
| $PbSO_4$ | 55.0 | 37.7 |
| $PbO_2$ | 19.0 | 16.5 |
| PbO | 9.2 | 8.5 |
| metal Pb | 6.1 | 6.1 |
| inerts | 10.7 | — |
| Total | 100.0 | 68.8 |

S = 5.8%

686 g of wet paste, equivalent to 500 g of dry paste, are dispersed in 500 ml of solution containing 200 g $H_2SO_4$/l; 1020 ml of solution containing 148 g $Na_2S$/l are added gradually, taking care that the pH does not rise above 2. Although the reaction is exothermic, external heating was used for the laboratory test to maintain the temperature around 60° C. for the two hours necessary for reactions 1a, 1b and 1c to go to completion.

The conversion reaction is complete when a small addition of $Na_2S$ causes the pH to rise rapidly to neutral. Filtration is then performed and the filtration panel washed. 562 g of wet solid are obtained together with 2180 ml of filtrate solution containing 127 g/l of $Na_2SO_4$.

The materials consumed in the conversion reaction on the dry paste weight were 20.5% $H_2SO_4$ and 30.2% $Na_2S$, in good agreement with stoichiometric data.

The conversion yield, calculated from the $Na_2S$ consumption, was 98.6%.

The product of the conversion was then dissolved in 7.6 l of fluoboric electrolyte containing:

10.2 g $Fe^{2+}$/l 25.2 g $Fe^{3+}$/l 38.5 g $Pb^{2+}$/l to obtain 8.1 l of electrolyte enriched with:

32.6 g $Fe^{2+}$/l 0.6 g $Fe^{3+}$/l 78.0 g $Pb^{2+}$/l

Reaction time 0.5 h, temperature 35° C.

The solution obtained was then ready for electrolysis in a diaphragm cell to obtain electrolytic lead and re-oxidation of the leaching medium.

The dry residue from leaching was 125 g with a Pb content of 3.56% and an S° content of 48.5%.

The Pb extraction yield from the paste, calculated from an analysis of the Pb in the residue and in the solution, was 98.7% confirming the yield calculated from the $Na_2S$ consumption.

The leaching residue was finally taken up in 500 ml of solution containing 140 g $Na_2S$/l. After filtration a polysulphide solution was obtained. Sulphur was precipitated from this solution by slightly acidifying with $H_2SO_4$ to obtain 60.3 g of elemental S, in good agreement with the stoichiometric quantity.

From this example and from the aforegoing description it will be apparent that the process of the invention represents a substantial improvement over the known art, in that it enables the active mass (paste) of exhausted lead batteries to be treated hydrometallurgically and electrochemically by solubilizing practically all the contained lead to form an electrolyte suitable for electrolysis, with negligible reagent consumption and with an electrical energy consumption in the subsequent electrochemical treatment of about 30% less than other processes and without releasing pollutant residues.

The ensuing calculation of the reagent quantities required to treat 1000 kg of exhausted lead batteries conforms the aforegoing. Based on the average quality of complete exhausted batteries containing:

|  | % | % metal | % S | kg/100 kg metal | kg/100 kg S |
|---|---|---|---|---|---|
| grids and terminals | 26 | 96 | — | 25 | |
| paste | 37 | 68.8 | 5.8 | 25.5 | 2.14 |
| polypropylene | 5 | | | | |
| inerts | 6 | | | | |
| solution 19% $H_2SO_4$ | 26 | | 6.2 | | 1.61 |
| Total | 100 | | | 50.5 | 3.75 | and taking account of the yields and materials consumptions of the described example, it can be concluded that processing 1000 kg of complete exhausted batteries provides:

| lead | 500 kg |
| elementary S | 46 kg |
| polypropylene | 50 kg |
| inerts | 84 kg (residue satisfying EPA standards for non-toxic refuse) | for which the following materials are consumed:

| | |
|---|---|
| powdered carbon | 57 kg |
| $H_2SO_4$ | 26 kg |

I claim:

1. A process for the hydrometallurgical and electrochemical production of electrolytic lead from an active mass containing lead sulphate $PbSO_4$, lead dioxide $PbO_2$, and lead oxide $PbO$ of exhausted lead batteries, comprising treating said active mass, containing lead sulphate $PbSO_4$, lead dioxide $PbO_2$, and lead oxide $PbO$, with sodium sulphide $Na_2S$ and sulfuric acid, giving rise to the following reactions:

$$PbSO_4 + Na_2S \rightarrow PbS + Na_2SO_4 \quad \text{1a)}$$

$$PbO_2 + 2Na_2S + 2H_2SO_4 \rightarrow PbS + S^\circ + 2Na_2SO_4 + 2H_2O \quad \text{1b)}$$

$$PbO + Na_2S + H_2SO_4 \rightarrow PbS + Na_2SO_4 + H_2O \quad \text{1c)}$$

2. A process as claimed in claim 1, comprising the following stages in succession:

a) treating said active mass with $Na_2S$ in a dilute aqueous sulphuric acid solution, giving rise to the following reactions:

$$PbSO_4 + Na_2S \rightarrow PbS + Na_2SO_4 \quad \text{1a)}$$

$$PbO_2 + 2Na_2S + 2H_2SO_4 \rightarrow PbS + S^\circ + 2Na_2SO_4 + 2H_2O \quad \text{1b)}$$

$$PbO + Na_2S + H_2SO_4 \rightarrow PbS + Na_2SO_4 + H_2O \quad \text{1c)}$$

b) leaching the lead sulphide PbS formed in said stage a) with ferric fluoborate in accordance with the reaction:

$$PbS + 2Fe(BF_4)_3 \rightarrow Pb(BF_4)_2 + 2Fe(BF_4)_2 + S^\circ$$

and separating said elemental sulphur $S^\circ$ formed thereby by filtration, and c) electrolyzing the lead fluoborate $Pb(BF_4)_2$ formed in said stage b) in a diaphragm cell, to obtain electrolytic lead at the cathode and ferric fluoborate in the anodic compartment.

3. A process as claimed in claim 2, comprising the following further stages:

d) reducing the sodium sulphate formed in said stage a) with carbon in accordance with the reactions:

$$Na_2SO_4 + 2C \rightarrow Na_2S + 2CO_2$$

$$Na_2SO_4 + 4C \rightarrow Na_2S + 4CO$$

and recycling said $Na_2S$ obtained thereby to said stage a)

e) treating said elemental sulphur $S^\circ$ separated in said stage b) with an $Na_2S$ solution in accordance with the reaction:

$$Na_2S + nS^\circ \rightarrow Na_2S_{n+1}$$

and treating the $Na_2S_{n+1}$ with sulfuric acid in accordance with the reaction $$Na_2S_{n+1} + \tfrac{1}{2}H_2SO_4 \rightarrow \tfrac{1}{2}Na_2SO_4 + NaHS + nS^\circ$$

said sulphur $nS^\circ$ so produced being in a pure form.

4. A process as claimed in claim 1, where in addition to said active mass, electrolyte from exhausted batteries is treated.

5. A process as claimed in claim 2, further comprising recycling the ferric fluoborate obtained in stage c) to stage b).

6. A process as claimed in claim 1, wherein said treating comprises suspending the active mass in a sulfuric acid solution and then reacting the obtained suspension with sodium sulphide.

7. A process as claimed in claim 1, wherein the sulfuric acid originates from the exhausted lead batteries.

8. A process as claimed in claim 1, wherein reactions 1a), 1b), and 1c) occur simultaneously.

9. A process as claimed in claim 1, wherein the reactions are conducted at a pH not exceeding 3.

10. A process as claimed in claim 1, wherein heat is not supplied during the reactions.

11. A process as claimed in claim 1, further comprising separating the PbS from the $Na_2SO_4$ by filtering.

12. A process as claimed in claim 11, further comprising evaporating and crystallizing the separated $Na_2SO_4$.

13. A process as claimed in claim 3, further comprising recycling the $Na_2SO_4$ and NaHS from stage e) back to stage a).

14. A process as claimed in claim 1, wherein the active mass further comprises metal Pb.

15. A process as claimed in claim 2, wherein the leaching of stage b) takes place at ambient temperature.

* * * * *